March 26, 1940.   C. E. CARROLL   2,194,494
TOOL
Original Filed Dec. 16, 1937
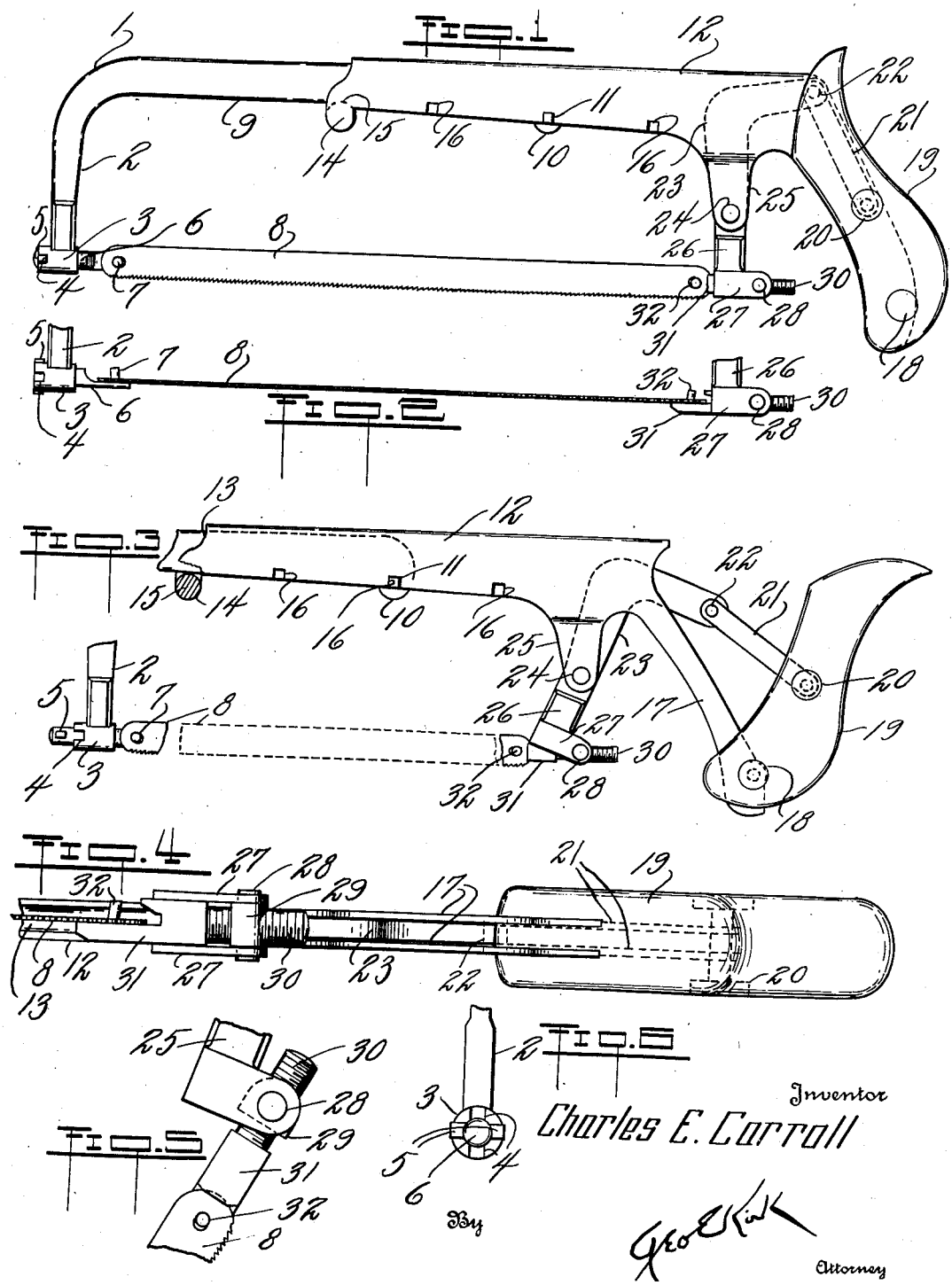
Inventor
Charles E. Carroll
By
Attorney Patented Mar. 26, 1940

2,194,494

UNITED STATES PATENT OFFICE 2,194,494

TOOL

Charles E. Carroll, Toledo, Ohio, assignor of one-half to Herman A. Krueger, Toledo, Ohio Application December 16, 1937, Serial No. 180,055
Renewed February 5, 1940

2 Claims. (Cl. 145—34)

This invention relates to quickly setting, adjusting and mounting tools.

This invention has utility when incorporated in hack saws for quickly setting, adjusting, and tensioning the blade from the grip.

Referring to the drawing:

Fig. 1 is a side elevation of an embodiment of the invention in a hack saw;

Fig. 2 is a fragmentary side elevation of the saw mounting connections shifted 90° from the position in Fig. 1;

Fig. 3 is a fragmentary view of the blade mounting features of Fig. 1, showing the handle portions rocked to slack off for the hack saw blade;

Fig. 4 is a bottom plan view adjacent the grip of Fig. 1;

Fig. 5 is a fragmentary view of the swivel connections for the blade adjacent the grip in position to be adjusted by rotation; and Fig. 6 is a fragmentary view from the left of Fig. 1 of the blade mounting.

L-frame section 1 has its short arm 2 terminate in tubular cross portion 3 with notches 4 in its outer termini to be engaged by cross lugs 5 of stem 6 insertable through this tube 3 at different 90° positions, in thereby locating, on the opposite side of this tube 3, pin 7 to provide detachable connection for hack saw blade 8.

Longer arm 9 of this L-frame section 1 at its terminus has depending lug 10 carrying cross pin 11. Spanning this L-section arm 9 is relatively telescopic frame section 12 having channel 13 embracing this arm 9 of the section 1. As telescoping over this arm 9, the section 12 terminally has pair of lugs 14 with closure pin 15 therebetween as a guide upon which the arm 9 may ride in the location of this cross pin 11 in desired notches 16 of this section 12 according to the length or approximate length of the hack saw blade 8. This telescopic section 12 has grip portion 17 therefrom to pivot pin 18 mounting companion grip portion 19. This grip portion 19 has pivot pin 20, from which extends link 21 to pivot pin 22 in angle lever 23 having fulcrum 24 between depending arms 25 from this telescopic section 12. This lever arm 23 is accordingly swingable on the fulcrum 24 as shielded by the side walls of this arm 12.

This angle lever 23 beyond the fulcrum 24 has protruding arm portion 26 terminating at right angles thereto in pair of parallel arms 27 rigid therewith. These parallel arms as away from the lever arm 26 carry pivot pin 28 mounting rockable nut 29 carrying threaded stem 30 from rectangular block 31. This block has pin 32 as a hack saw engaging pin companion to the pin 7 at the connection 6. This hack saw blade connection 31, as rectangular in form, may be rocked on the pin 28 as a fulcrum clear of the pair of parallel arms 27, thereby to permit rotation of the fitting 31 as to the pin 28. This rotation may be effected from the blade 8 as released from the pin 7 to thereby effect nicety of adjustment beyond the selected length adjustment from the notch pairs 16.

At such selected position, locking of the connection 31 between the arms 27 is a holding of this connection in the 90° thrown position responding to that position effected by the notches 4 cooperating with the cross pin or lugs 5 in the connection 6. At such adjusted position, say with the grip portion 19 rocked on the pivot 18 away from the grip portion 17, there is a degree of slack to permit this ready adjustment for the blade 8. Accordingly, as the operator grasps the grip portions 17, 19, to swing such toward each other into grip completing position, the link pair 21 on opposite sides of the angle lever 23 thrust such angle lever into the telescopic section 12, with a rocking the remote arm 26 on the fulcrum 24 to shift the connection 31 away from the connection 6, thereby tensioning the hack saw blade for desired working operation.

These features of ready blade mounting and length selection for the blade connections, with ready self-locking adjustment at the connector swivel 31, have supplemental thereto the grip tensioning for quick, effective holding; while the release for replacement of a blade is likewise quickly effected by merely swinging the handle portion on the pivot 18 away from the handle portion 17. This gives an effective hack saw assembly unit for this tool.

What is claimed and it is desired to secure by Letters Patent is:

1. A saw frame for holding a blade of the hacksaw type, said frame comprising an L-section, a relatively telescopic adjustable frame section embodying a first grip portion rigid with said adjustable frame section and an offset toward the blade from the telescopic section, and a second grip portion pivoted at one end remote from the frame section on, and relatively movable to house, the first grip portion and having a blade engaging connection including a lever fulcrumed intermediate its ends in said offset, said lever having both terminals offset in parallelism, one of these latter offsets being at the blade end of the lever and normally extending in line with the blade, the other toward the grip and connected by a link to said second grip portion at a point remote from the pivot of the latter and normally locked in blade tensioning position by said grip portion and the link being held past dead center position when the first grip portion is housed within said second grip portion, said L-section having a companion blade connection to form a bow exteriorly of which the grip portions are located, and a blade between the connections and normally tensioned between said frame sections.

2. A saw frame for holding a blade of the hacksaw type, said frame comprising an L-section, a relatively telescopic adjustable frame section embodying a first grip portion extending from said adjustable frame section and a second grip portion pivoted to the first grip portion at the end of the latter remote from the adjustable section, a link from an intermediate point on the second grip portion and movable into a position past dead center with respect to said second grip portion upon clasping of both grips by the hand of the user, a lever from the link fulcrumed intermediate its ends on the adjustable frame section and having an offset terminal forming a channel normally aligned with the blade, and a rotatably adjustable connection from the blade to the lever adapted to be locked in said channel against adjustment rotation as to the blade by rocking the lever into blade tensioning holding position as the link throws the lever past dead center position at clasp adjusted relation of the grip portions.

CHARLES E. CARROLL.